May 27, 1952  R. L. HALLOCK  2,598,052
SELF-LOCKING NUT
Filed Sept. 14, 1944
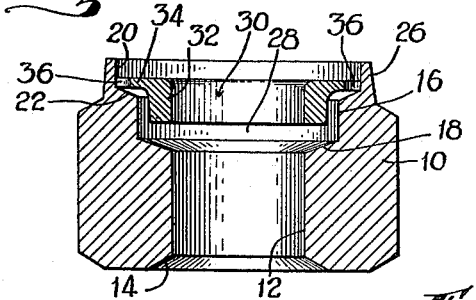
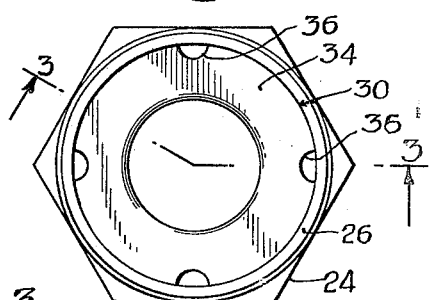
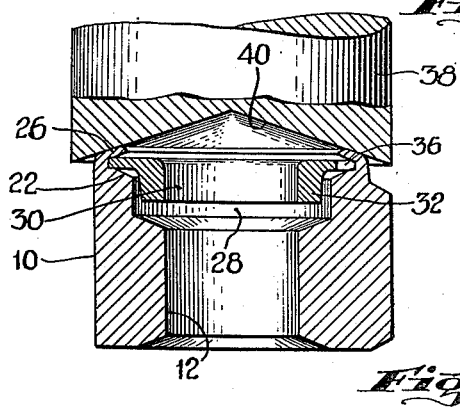
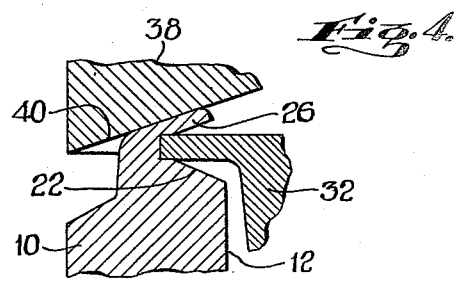
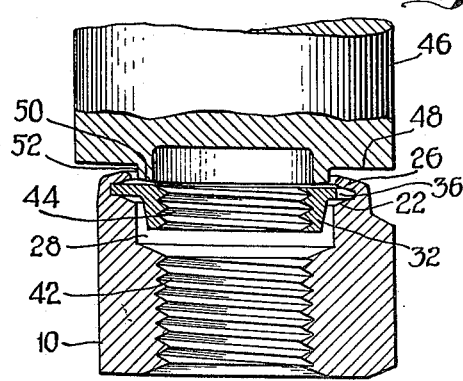
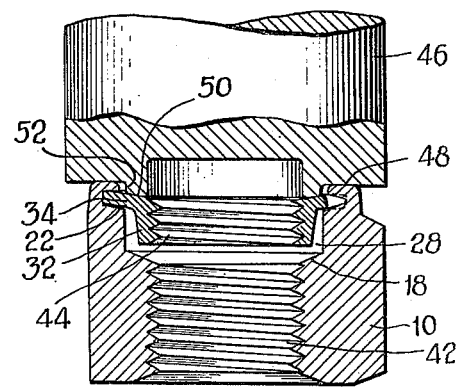
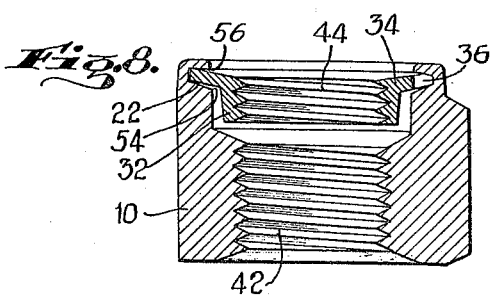
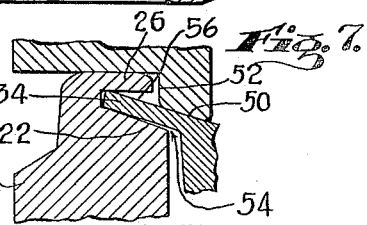
INVENTOR
Robert Lay Hallock
BY
his ATTORNEY Patented May 27, 1952

2,598,052

UNITED STATES PATENT OFFICE 2,598,052

SELF-LOCKING NUT

Robert Lay Hallock, Larchmont, N. Y., assignor to Elastic Stop Nut Corporation of America, Union, N. J., a corporation of New Jersey Application September 14, 1944, Serial No. 553,987

3 Claims. (Cl. 151—21)

The present invention relates to self-locking nuts and the manufacture thereof and has particular reference to self-locking nuts of the kind in which the locking action is secured by means of a flexible threaded metallic insert which in relaxed state is so positioned that the thread of the insert is in out-of-phase relation with the thread of the main thread section of the nut, the out-of-phase threads being brought into phase relation when the nut is applied to a bolt or other cooperating threaded element. Still more particularly, the invention is in the nature of an improvement upon that form of self-locking nut disclosed and claimed in U. S. Patent 2,318,398 granted to D. C. Hungerford, May 4, 1943.

In the manufacture of nuts of the kind under consideration, a nut body is formed with a recess or well for the reception of a locking insert having a flexible diaphragm portion, which, after being assembled in the body, is then threaded, together with the body of the nut, to provide two thread sections which are in phase. Thereafter the insert is flexed so as to take a permanent set with the thread of the insert section in out-of-phase relation with the main thread section. The extent to which the insert thread is moved to out-of-phase relation with the main thread is highly critical if the desired locking action is to be obtained. In order to secure the required character of locking action the out-of-phase displacement must be sufficient so that when the thread of the insert is engaged by a bolt thread it is displaced back toward its in-phase position by an amount which will cause a substantial reaction force to be exerted axially on the bolt to create a relatively high frictional pressure engagement between the flanks of the threads in the main thread section and thereby provide substantial resistance to turning of the nut on the bolt due to vibration or other forces tending to cause the nut to back off. Also, the amount of out-of-phase displacement must be very carefully limited so that it will amount to less than one-half of the pitch of the thread. If one-half pitch displacement is exceeded then the bolt thread will engage the thread of the insert so as to pull the insert thread toward the main thread section, which is highly undesirable, since that action causes the insert to establish frictional pressure contact between the wrong thread flanks in the main thread section.

Nuts of the kind under consideration are used in large quantity in relatively small sizes, including the machine screw sizes such as Nos. 8 and 10, with as high as 32 or more threads per inch, and the provision of a satisfactory nut of the kind contemplated, particularly in these small sizes, presents an extremely difficult problem both from the standpoint of securing the desired degree of accuracy and from the standpoint of being able to form and install a satisfactory insert within the extremely small space limitations available in standard sized nut bodies for use with such small bolts or screws.

This is further particularly true because of the fact that such accuracy must be maintained in the manufacture of the product by cheap mass production methods which will enable the product to be produced and sold at prices low enough to make the product commercially useful.

The general object of the present invention is therefore the provision of a new and improved form of nut of the character described which is readily manufacturable by mass production methods at low cost and when manufactured by such methods may be made to consistently conform to extremely close tolerance specifications and in very small sizes. Other and more detailed objects of the invention and advantages to be derived from its use will be more fully apparent from the ensuing portion of this specification taken in conjunction with the accompanying drawings in which:

Fig. 1 is a central section of a partially assembled nut body and insert embodying the principles of the invention;

Fig. 2 is a top plan view of Fig. 1;

Fig. 3 is a view similar to Fig. 1, showing a preliminary assembling operation, the section of the nut being taken on line 3—3 of Fig. 2;

Fig. 4 is a fragmentary view showing on enlarged scale a part of the structure illustrated in Fig. 3;

Figs. 5 and 6 are views showing further steps in the assembling operation, the nuts being sectioned on the same line as the nut shown in Fig. 3;

Fig. 7 is a view similar to Fig. 4 of a part of the structure shown in Fig. 6, and Fig. 8 is a view similar to Fig. 1 showing the completed nut.

Referring now to the drawings, 10 indicates a nut body blank having a bore 12 for the main thread section of the nut which is advantageously provided with the usual countersink 14 at the base of the nut. At the upper end of the bore 12 there is provided a counterbore 16 which in the embodiment illustrated is connected with the bore 12 by means of the conical shoulder 18. In so far as the present invention is concerned, the shoulder 18 need not be conical but is advantageously of this form if the nut body is formed on an automatic screw machine or the like, since then the counterbore 16 can be made by the ordinary form of machine drill. Above the counterbore 16 a second counterbore 20 is provided which is connected with the counterbore 16 by means of the conical shoulder 22. The conical shape of this shoulder is of some importance for reasons which will hereinafter appear.

The nut body is, in the form illustrated, divided into a main body portion which in the present instance is of the usual hexagonal form to provide wrench-engaging flats 24 and above this main body portion the upper or locking section of the nut is shaped to provide an annular rim of constant radial cross section, the outer surface of which is advantageously but not necessarily made slightly conical. As will be evident from Fig. 1, the counterbores 16 and 20 provide a recess or well 28 for the reception of a locking insert indicated generally at 30 which is formed with a central annular barrel portion for threading, depending from a thin flange or diaphragm 34, the barrel portion being materially heavier in section than the diaphragm. The diaphragm is advantageously provided with a series of notches or knurls 36 peripherally spaced around its outer perimeter.

With the insert placed in the well as shown in Figs. 1 and 2, the parts are preliminarily assembled by a punch operation employing a punch 38, the working face 40 of which is concavely conical, at least over that portion of the face which contacts and deforms the rim 26 to bend it inwardly as shown in Figs. 3 and 4. In the example shown the face 40 is entirely conical which provides the manufacturing advantage that for this preliminary assembling operation it is not necessary to change the punch to accommodate different sizes of nuts, the punch being in the nature of a universal tool useable for a relatively wide range of nut sizes.

As will be more readily seen from Fig. 4, the preliminary operation does not flex the insert diaphragm but simply operates to lock it in place against axial or circumferential displacement. Ordinarily the material of the insert will be harder than the material of the nut body. For example, for the manufacture of a ferrous nut the nut body may be of mild steel or the like while the insert may preferably be of a harder and corrosion-resisting alloy such as "Inconel." Since in order to secure the desired flexure of the diaphragm, which must necessarily in small nuts be of small diameter, the diaphragm must be relatively very thin, for example approximately fifteen thousandths of an inch suitable for a 10—32 nut and for this reason it is highly desirable to make the insert of rust- or corrosion-resisting material. In the case of a non-ferrous nut such as brass, the insert will ordinarily be of a spring brass somewhat harder than the brass of the nut body. If the insert is harder than the body the perimeter of the rim will force itself into the material of the body and, conversely, if the body is harder than the insert the material of the body will flatten or round over the edges of the diaphragm. In either case, however, material of the body will be forced into the notches 36 so that the insert will be held against turning within the nut body.

As will also be appreciated from Fig. 4, it is desirable to make the angle of the shoulder 22 the same as the angle of the punch face 40, since when these angles are equal, equal pressure conditions are imposed on the upper and lower edges of the perimeter of the diaphragm and during the preliminary assembling operation there is no tendency to flex the diaphragm. By way of example, for small size nuts having fine threads, an angle of approximately 20° for the punch face 40 and shoulder 22 has been found to be very satisfactory.

After the preliminary assembly operation the nut is then threaded so as to be in the form shown in Fig. 5, in which the main body portion is provided with a thread 42 constituting the main thread section of the nut and the insert is provided with a thread 44 constituting what may be termed the locking section, the latter thread section being in phase with the main thread section and the two sections being separated axially.

After the threading operation, assembly of the nut is completed and the desired displacement of the locking section is effected simultaneously by a second punch operation employing a punch 46 having an annular flat working face 48 radially inside of which there is located an annular convex working face 50 which in the form illustrated is conical. The faces 48 and 50 are separated by a shoulder 52, the height of which is slightly greater than the thickness of the outer portion of the rim 26 and the diameter of which is only very slightly less than the diameter of the perimeter of rim 26 after the rim has been bent inwardly. By the second punching operation the outer part of rim 26 is bent over flat and simultaneously the insert is pushed downwardly by the face 50 of the punch, to dish the diaphragm 34 to the form shown in Figs. 6 and 7. In this operation the diaphragm is not offset by a severe distortion as in the process disclosed in the aforementioned Hungerford patent, since the nature of the contact between the perimeter of the diaphragm and the nut body is such that this perimeter can and does, in effect, pivot in its seat in the longitudinal plane of the nut as the diaphragm is dished. The amount of dishing is controlled by the height of the shoulder 52 on the punch, this height being related to the thickness of the outer part of rim 26, against which the flat face 48 of the punch bottoms as a stop, to secure the desired angle of dish of the diaphragm. This is important from a manufacturing standpoint since no manufacturing tolerance has to be maintained with respect to any distance in the nut body, as would be the case if the stop limiting the amount of displacement of the insert were remote from the diaphragm, as for example, if the stop were provided by the shoulder 18 and the insert were distorted until the barrel portion of the insert abutted against the shoulder 18.

As will be observed from Figs. 5 to 7, the contact between the punch face 50 and the upper face of the diaphragm is limited to the region radially outside the major diameter of the thread 44. If this is not done, undesirable distortion of the top end of the thread during the final assembling and dishing operation may occur. As will further be observed from Fig. 7, a V-shaped clearance 54 is preferably maintained between shoulder 22 and the bottom face of the diaphragm when the latter is fully dished by the punch, so that the angle of dish is controlled by the height of the punch shoulder 52 relative to the thickness of the inturned edge of rim 26, rather than by bottoming the diaphragm against the shoulder 22. The reasons for this are that close tolerances can readily be kept for the height of the shoulder on the tool and the thickness of the rim, and that danger of crushing the diaphragm between the punch face and the shoulder 22 is avoided.

Since the insert must necessarily be of material having resilient spring-like qualities if the nut is to function properly, there will be a certain amount of return movement or springback of the diaphragm due to elastic recovery after the insert has been dished by the punch. Fig. 8 shows the complete nut with the diaphragm 34 in relaxed condition, the clearance 54 having increased due to the elastic recovery of the diaphragm. In its completed form the thread section 44 in the insert is in out-of-phase relation with the main thread section 42 and is positioned so that when a bolt or other threaded element is threaded through the nut the barrel of the insert is pushed upwardly by the bolt to bring the thread sections into phase relation. When this occurs a reaction force is imposed on the parts so as to bring the lower flank of the bolt thread into pressure contact with the upper flank of the thread 42 and to bring the upper flank of the bolt thread into pressure contact with the lower flank of the thread 44 in the insert. As this action occurs the diaphragm is free to flex by a pivotal movement about its outer perimeter in the longitudinal plane of the nut since in the final assembling operation the rim 26 is bent over so that its lower face is flat and normal to the axis of the nut while the upper face of the diaphragm is dished to conical form so that there is a V-shaped clearance 56 between the upper face of the diaphragm and the lower surface of the rim. Thus the diaphragm is free to flex over substantially its entire area, this in turn enabling sufficient movement to be obtained to effect the purposes of the nut without stressing the diaphragm beyond its elastic limit, even though the diaphragm is of relatively small overall diameter, as is the case in a small size nut. In other words, with the construction provided by this invention, the entire area of the diaphragm is effective as a flexible resilient member, which is of the greatest importance in the case of small nuts where the diaphragm size is necessarily very much limited.

While for the purpose of disclosing and explaining the present invention it has been illustrated and discussed only in connection with the manufacture of a self-locking nut, and particularly a standard hexagonal nut, it will be apparent to those skilled in the art that the principles of the invention may equally well be applied to self-locking nuts of other than hexagonal configuration and also to other self-locking threaded devices providing a body in which a threaded bore with cooperating recess or well for the reception of a locking insert can be provided. The invention is therefore to be considered as not limited to the specific embodiment herein disclosed by way of example but is to be understood as embracing all forms of device falling within the scope of the appended claims.

What is claimed:

1. A self-locking nut comprising a metal body providing a bore and an insert receiving well concentric with said bore, said well having an annular bottom surface encircling said bore, an annular conical shoulder concentric with said bottom surface located axially above the bottom surface and of larger diameter than the bottom surface and an annular flange portion extending upwardly from the outer perimeter of said shoulder, and an annular insert of elastic metal located in said well, said insert comprising a rigid barrel portion and a thin flexible diaphragm portion extending outwardly from the upper end of the barrel portion, the major part of said barrel portion being located in the lower part of the well between said bottom surface and said shoulder, said diaphragm being positioned over said conical shoulder and contacting said shoulder only at the outer perimeter of the diaphragm whereby to provide axial clearance between said shoulder and substantially the entire area of the diaphragm to permit substantially free flexure of the entire diaphragm, said annular flange being inturned over the upper outer edge of the diaphragm to fix said insert in said well, and said bore and said barrel portion being threaded to provide two axially aligned thread sections the threads of which are in out-of-phase relation with respect to each other.

2. A nut as set forth in claim 1 in which said diaphragm is dished to conical form, said conical shoulder having a greater angle of slope than that of the conically dished lower surface of said diaphragm, whereby to provide said axial clearance.

3. A nut as set forth in claim 1 in which said inturned flange contacts the upper face of said diaphragm only at the outer perimeter thereof, there being an annular clearance space between the upper face of the diaphragm inwardly of the perimeter thereof and the overlying portion of the inturned flange.

ROBERT LAY HALLOCK.

REFERENCES CITED

The following references are of record in the file of this patent:

UNITED STATES PATENTS

| Number | Name | Date |
|---|---|---|
| 249,612 | Grinnell | Nov. 15, 1881 |
| 609,144 | Goddin | Aug. 16, 1898 |
| 1,708,040 | Zerk | Apr. 9, 1929 |
| 2,102,489 | Simmonds | Dec. 14, 1937 |
| 2,222,460 | Crowley | Nov. 19, 1940 |
| 2,318,397 | Hungerford | May 4, 1943 |
| 2,318,398 | Hungerford | May 4, 1943 |
| 2,320,032 | Danforth | May 25, 1943 |
| 2,336,023 | Luce | Dec. 7, 1943 |